US006832521B1

(12) United States Patent
Courtney et al.

(10) Patent No.: US 6,832,521 B1
(45) Date of Patent: Dec. 21, 2004

(54) DATA COLLECTOR INSTRUMENT WITH INTEGRAL SPEED SENSOR

(75) Inventors: Stuart Courtney, Flint (GB); Dennis H. Shreve, Westerville, OH (US)

(73) Assignee: Entek IRD International Corporation, Milford, OH (US)

( * ) Notice: Subject to any disclaimer, the term of this patent is extended or adjusted under 35 U.S.C. 154(b) by 322 days.

(21) Appl. No.: 09/704,102

(22) Filed: Nov. 1, 2000

(51) Int. Cl.[7] .............................................. G01N 29/00
(52) U.S. Cl. ............................. 73/658; 73/593; 73/602; 73/660
(58) Field of Search ......................... 73/658, 660, 593, 73/600, 602, 495, 866.5; 702/56, 122, 189; 324/175

(56) References Cited

U.S. PATENT DOCUMENTS

| | | | |
|---|---|---|---|
| 3,489,013 A | | 1/1970 | Taylor et al. ................. 73/446 |
| 5,059,901 A | * | 10/1991 | Van Voorhis ............... 324/175 |
| 5,231,284 A | * | 7/1993 | Mizutani et al. ........ 250/231.13 |
| 5,612,544 A | * | 3/1997 | Busch ......................... 250/556 |
| 5,870,699 A | | 2/1999 | Canada et al. .............. 702/190 |
| 5,895,857 A | * | 4/1999 | Robinson et al. ............. 73/660 |
| 6,078,874 A | * | 6/2000 | Piety et al. ................. 702/122 |

OTHER PUBLICATIONS

Prüttechnik, *Vibscanner, The clever data collector for better maintenance*, Product Advertisement.

* cited by examiner

*Primary Examiner*—Hezron Williams
*Assistant Examiner*—Jacques M. Saint-Surin
(74) *Attorney, Agent, or Firm*—Wood, Herron & Evans, L.L.P.

(57) ABSTRACT

A data collector having an integrated laser tachometer. The data collector includes, within a housing that can be held by a single hand, circuitry for receiving a vibration signal to be digitized, as well as an optical system for receiving light from outside said housing to be converted to a digital tachometer signal. Digital signal processing circuits within the housing receive, store or process the digitized vibration signal and/or the digital tachometer signal, for the purpose of predictive maintenance. The housing of the data collector also holds a display and input keys, so that an operator may use the same hand for holding and controlling the data collector, and for holding the integrated laser tachometer. This frees a hand for holding an accelerometer or for other purposes. Use of a data collector with an integrated laser tachometer is thus substantially more convenient than using a data collector with a separate, nonintegrated laser tachometer attachment.

24 Claims, 2 Drawing Sheets

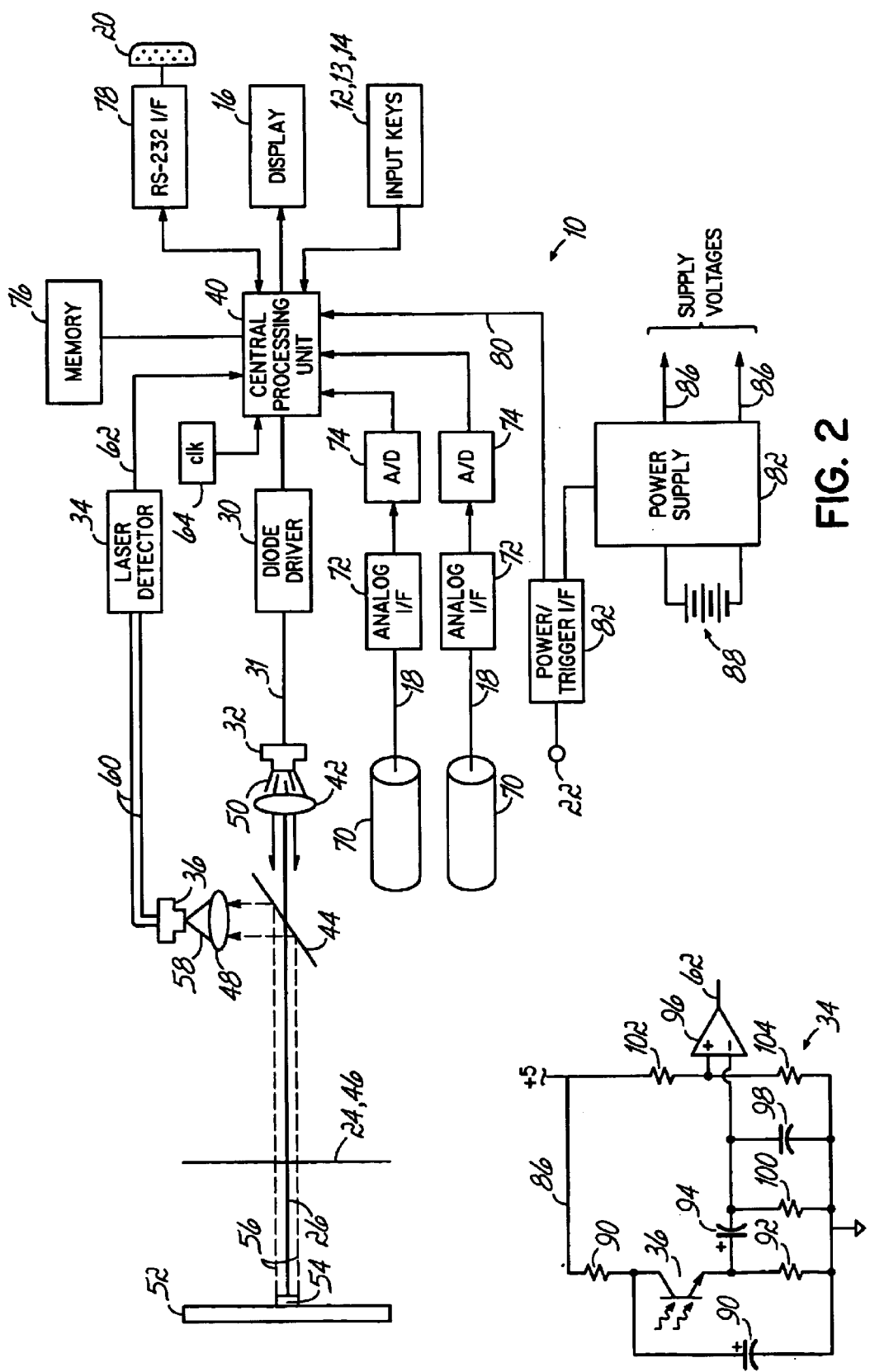

DATA COLLECTOR INSTRUMENT WITH INTEGRAL SPEED SENSOR

FIELD OF THE INVENTION

The invention relates to collection and analysis of data for the purposes of predictive maintenance.

BACKGROUND OF THE INVENTION

There are many well known methods for collecting data for performing predictive maintenance. Typically, in these methods a vibration sensor such as a piezoelectric accelerometer is mechanically coupled to the machine to be monitored. The vibration sensor collects vibrations from the machine and converts these vibration to an electrical signal. The electrical signal is processed by suitable signal processing and converted from analog to digital form. The resulting digital signal is stored for later analysis.

Often it is necessary to evaluate the rotational speed of the machine being monitored as part of the collection of vibration data. This is often done through the use of a tachometer mounted to the machine or used with the machine. A difficulty arises when no such tachometer is available. To deal with this situation, a portable tachometer must be used. U.S. Pat. No. 5,059,901, owned by the assignee of the present application, and incorporated by reference herein in its entirety, describes one such portable tachometer. The tachometer described in U.S. Pat. No. 5,059,901 utilizes laser light to measure rotational speed of a machine. Specifically, a laser provides a beam of light, visible even under extremely bright ambient light conditions, to be used to measure the rotational speed of a rotating device from greater distances than previously possible. A diverging beam of laser light is collimated and transmitted to a rotating body the RPM of which is to be measured. The rotating body includes a reflective strip or strips, so that during rotation the reflection of the beam is modulated. The modulated reflected light is received by the tachometer where it is focused onto a photodetector, which converts it into an electrical signal representative of the speed of the rotating body.

Analysis of a vibration signal from a machine typically involves one or both of (1) comparing that signal to previously collected signals to identify an variations that would be indicative of machine wear and possible impending failure, and (2) forming a frequency spectrum of the vibration signal and evaluating this spectrum for patterns indicative of potential failures. Typically these operations are performed through the use of a data collector. A data collector includes analog signal processing electronics for receiving a vibration signal and conditioning that signal, and an analog to digital converter for digitally sampling the analog signal so that it may be stored and analyzed. Often a first vibration signal is used as a trigger or reference signal in connection with the collection of a second vibration signal, in which case two accelerometers are used. Signal analysis may be performed using the data collector itself or by uploading collected and digitized signals from the data collector to a host computer where signal analysis is performed.

It will be appreciated that a data collector is typically portable, to facilitate its use in an industrial environment. A technician will carry the data collector to the machines being monitored and then collect vibration and speed data at each machine. Unfortunately, however, when a laser tachometer is being used, the collected devices may be cumbersome to handle, as the laser tachometer must be held in-hand and sighted to the location of the rotating body being used as the tachometer reference. At the same time, one or two accelerometers must be held or mounted to the machine to collect vibrations. And, of course, the data collector itself must be held or placed on a surface where its display can be read and keys can be reached, during this process. Thus, the use of all of these features in a portable data collector is an inconvenient process and requires complex manipulation of the collector and its various attachments.

Accordingly, there is a need for a data collector and data collection method utilizing a laser tachometer that is more convenient and less complex and thus can be more readily used in a wide range of applications.

SUMMARY OF THE INVENTION

In accordance with principles of the present invention, this need is met by a data collector having an integrated tachometer device.

Specifically, a data collector in accordance with principles of the present invention comprises a housing, a vibration signal input on the housing for receiving a vibration signal to be digitized, an optical system in the housing receiving light from outside said housing to be converted to a digital signal, and a digital signal processing circuit receiving, storing or processing the digitized vibration signal and/or the digital signal converted from said received light, for the purpose of predictive maintenance.

In the specific embodiment disclosed herein, a light source emits light from the housing through an aperture, for reflection and return to the optical system. The light is generated by a laser diode, collimated by a collimating lens. A filter is positioned between the housing aperture and the PIN diode, to filter light other than at a wavelength of the light source. The reflected light is detected by a PIN diode. Reflected light is directed to the PIN diode by a beam splitter in the optical system. A threshold comparator compares current flow in the PIN diode to a threshold, and produces a digital signal to the digital signal processing circuit when said threshold is exceeded, so that the processing circuit may compute a rate of rotation of a moving element in response to timing of the digital signal from said threshold comparator, thus forming a laser tachometer. Rotational speed information generated from the integrated tachometer, may thus be used by the data collector as part of analyzing or storing the digitized vibration signal.

The housing of the data collector in the disclosed embodiment also holds a display and input keys, and is sized to fit in a single hand of an operator. As a consequence, an operator may use the same hand for holding and controlling the data collector, and for holding the laser light source for the laser tachometer. This frees a hand for holding an accelerometer or for other purposes. Use of a data collector with an integrated laser tachometer, in accordance with principles of the present invention, is thus substantially more convenient than using a data collector with a separate, nonintegrated laser tachometer attachment. The invention thus provides substantial improvement in the process of data collection over the prior art.

The above and other objects and advantages of the present invention shall be made apparent from the accompanying drawings and the description thereof.

BRIEF DESCRIPTION OF THE DRAWING

The accompanying drawings, which are incorporated in and constitute a part of this specification, illustrate embodi

FIG. 2 is a block diagram of the data collector of FIG. 1 and the laser tachometer system included therein;

FIG. 3 is a circuit diagram of the laser detector included in the data collector of FIG. 2.

DETAILED DESCRIPTION OF SPECIFIC EMBODIMENTS

Figure 1:
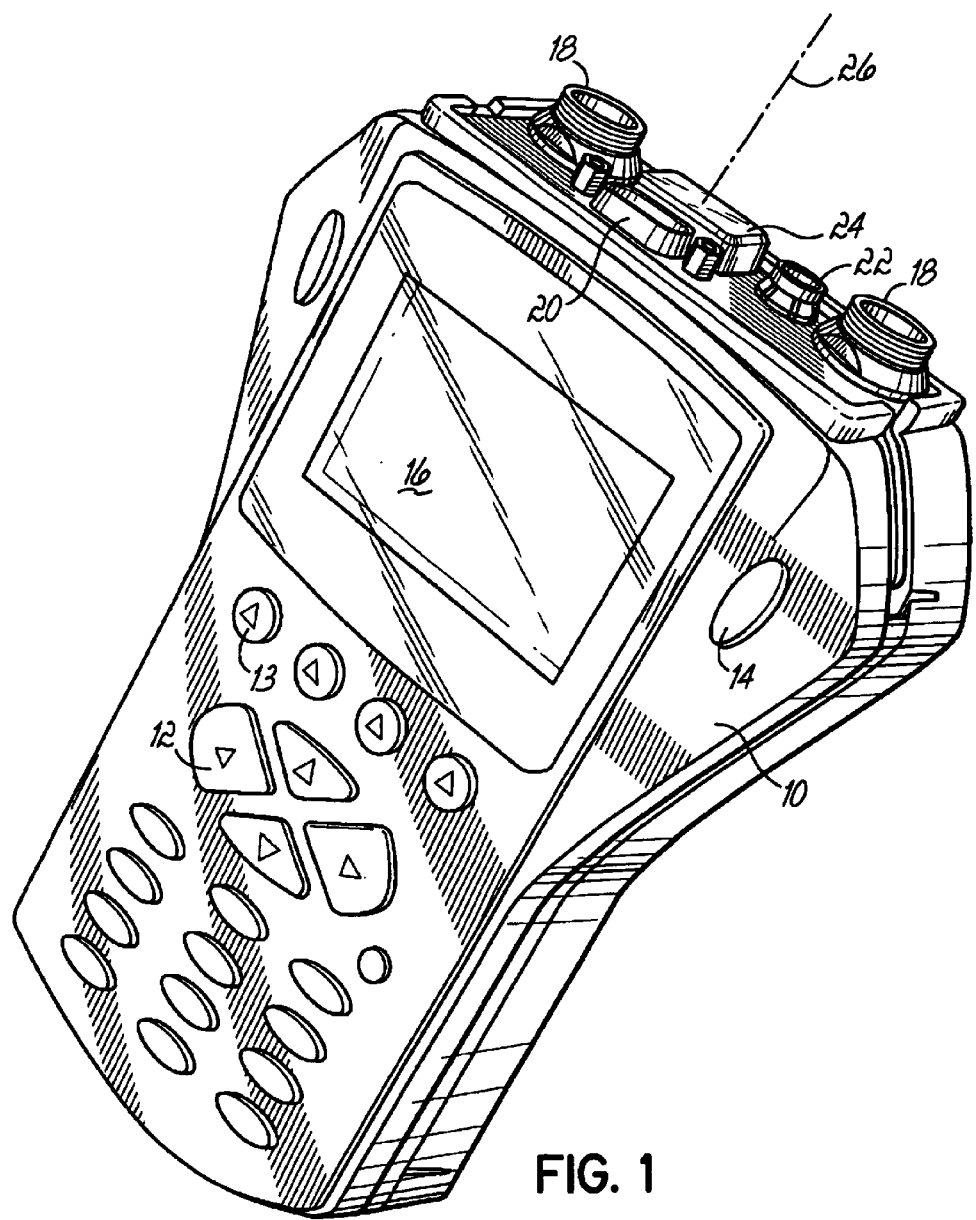
- FIG. 1 is an illustration of a palmtop data collector including an integrated laser tachometer.

Referring to FIG. 1, a data collector 10 in accordance with principles of the present invention is sized and designed for hand held operation. Data collector 10 will be referred to as a palmtop data collector for the reason that it is sized for holding in a single hand. The data collector includes a microprocessor and software used by the operator to collect data and transfer the collected data to a host PC. To control operations of the data collector, the operator utilizes a keypad 12 comprising a plurality of alpha numeric keys, as well as soft keys 13, and an STORE key 14. The soft keys 13 are positioned adjacent to areas of a display 16 so that the user may be presented with functions assigned to the soft keys 13 that can be changed for different operations of the palm top data collector 10. The STORE key 14 may be used in connection with the keys of the keypad 12 or the soft keys 13 to indicate acceptance of identified values or settings that are selected with those other keys. The STORE key is replicated on both sides of the housing o the palm top data collector, for the convenience of left- and right-handed users. Utilizing this user interface, an operator may activate the palm top data collector to collect data from machinery to be monitored, as is known in the art.

Palmtop data collector 10 includes a plurality of connectors and other elements on its top end. These include a pair of accelerometer jacks 18 for connection to dual accelerometers for collecting vibration data from machinery being monitored. Vibration data collected through the accelerometer jacks 18 is stored within the palmtop data collector 10 for analysis and/or later delivery to a host computer system. The palmtop data collector 10 is connectable to host computer system utilizing a RS232 serial port 20, which may be coupled to the serial port of a host computer utilizing a standard RS232 serial cable. The palm top data collector 10 includes hardware for initiating a RS232 connection to a host computer and for transferring stored vibration data collected from accelerometers to the host computer. The data uploaded to the host computer may then be analyzed in detail and compared with historic data previously uploaded to the host computer, as is known in the art.

The top panel of palm top data collector 10 further includes a power and trigger signal connector jack 22 for connection to an external trigger signal, such as one created by an optical detector on a rotating machine. This jack may also be used for connection to an external power supply whenever electrical power is available, such as when the palm top data collector 10 is being connected to a host computer to transfer collected vibration data. Power/trigger jack 22, when connected to a power terminal, receives DC or AC power to power the circuits within palm top data collector 10. AC or DC power for connection to power jack 22 may be generated utilizing a wall converter of conventional type as are commercially available.

A final feature of the top surface of the data collector 10 is a window or aperture 24 through which a tachometer laser beam is emitted for performing tachometer functions in accordance with the principles of the present invention. As is described in further detailed below, the circuitry for generating a laser beam and for receiving this laser beam and converting it to a tachometer signal is incorporated within the electronics of the palm top data collector 10. The laser beam generated by data collector 10 is emitted from window 24 as is illustrated at 26. The laser beam impinges upon the rotating element of the machinery to be monitored to detect passage of reflective strips that are indicative of machinery rotation. The resulting reflection signal is detected and converted into a rotation speed within the circuitry of the palm top data collector 10.

Referring now to FIG. 2, the electrical block diagram of a palm top data collector in accordance with the principles of the present invention can be explained. The components of this device include a diode driver circuit 30 for driving a laser diode 32 for producing laser tachometer signals. The diode driver circuit 30 supplies energizing voltage through line 31 under control of a central processing unit 40, when laser tachometer functions of the palm top data collector have been enabled. The energizing voltage supplied through line 31 causes laser diode 32 to emit light. Diode driver circuit 30 also provides power control signals to a laser detector circuit 34 so that laser detector circuit 34, when energized, may detect laser light reflected from the rotating body to a photo diode 36. Light detected by photo diode 36 is converted to an electrical signal by laser detector circuit 34 and then forwarded to central processing unit 40.

The laser beam is processed by an optical system including an collimating lens 42, beam splitter 44, diachroic filter 46, a focusing lens 48 and a PIN photo diode 36. The optical components identified above are formed in an opening of the main housing of the palm top data collector. The axis of the optical system is directed through the window or aperture 24 at which the diachroic filter 46 is mounted. The inner surface of the housing where the optical system is positioned (hereafter known as the optical system housing) must be rendered nonreflective by being coated with a nonreflective substance.

Within the optical system housing, a beam splitter 19 is mounted at a 45° angle to the axis of the optical system. Collimating lens 42 is rigidly fixed within the optical housing, at an end proximate the laser light generating diode 32. Collimating lens 42 is positioned in front of laser diode 32 such that lens 42 intercepts and focuses a diverging beam 50 of light emitted by diode 32 into a collimated beam 36. The beam follows the axis of the optical system and is emitted from the opening in the palmtop data collector housing. Collimating lens 42 is rigidly fixed using a mechanical means permitting the position of the lens to be adjusted relative to the emitting surface of laser diode 32 to fix the focal point of beam 26. Beam 26 is focused at infinity to produce a collimated beam emerging from the palmtop data collector.

The operating range of the palm top data collector is approximately 2 meters, using a class 2 laser. Although the device utilizes a single lens for collimation of the beam 50, the ultimate range and performance of the device can be enhanced by using a lens or compound lens assembly of different parameters.

Ordering beam splitter 19 is mounted at a 45° interface within the optical housing, so as to extend diagonally across the axis of the beam 26. The dielectric coated beam splitter 44 provides for a 50/50 ratio of the transmitted to reflected electromagnetic beam energy incident upon it. The reflected portion of such an incident beam will be reflected as a substantially 90° angle from the axis of the beam 26.

Beam 26 is incident at an angle of 45° upon a first face of the beam splitter 44. A 50% portion of beam 26 is reflected by beam splitter 44 and absorbed in a nonreflective coating of the optical housing. The remaining 50% of beam 26 is passed to a diachroic spectro line filter 28. Filter 28, is a standard hardware item, selected for transparency of at least 60% within the electromagnetic wavelength of the laser diodes operating frequency, in one example, a wavelength of 670 nm. The function of filter 28 is to prevent the entrance of ambient electromagnetic energy with wavelengths other than 670 nm, will simultaneously passing at least 60% of the selected wavelength embodied in the reflected beam.

It will be appreciated by those skilled in the art that the device. of the present invention could be operated without a diachroic spectral line filter 46 in cases where noise immunity is of limited importance. Also, laser diode 32 could be modulated and synchronous deflection techniques could be employed within laser detector circuit 34 to provide high ambient noise immunity in either in conjunction with or without diachroic spectral line filter 46.

Light passing through diachroic spectral line filter 46 will continue, and impinge upon the rotating body 52 for which rotational speed is to be measured. The fact that laser beam 26 is composed of coherent red visible light enhances the target ability of the device, in that the laser beam may be viewed incident upon the surface of the rotating body 52.

As a uniform body 52 would not provide a point of reference for counting revolutions, a device such as 54, which can be a strip of reflecting tape, for example, can be affixed to the body to provide regular strong reflections of the incoming laser beam 26. It should be noted, member 52 may possess variation in reflectivity of its surface, whether intentional or intended, that can be used as reference point for counting revolutions; in such a circumstance, it may not be necessary to introduce a reflective element 54.

Typically, when beam 26 is instant upon the surface of a rotating member 52, at the point where reflective element 54 is affixed thereto, beam 26 will be reflected through a 180° angle. The beam so reflected will be referred to as a beam 56. The intensity of the reflected beam 56 is pulsatingly modulated as the reflective element 54 moves into and out of position to reflect the incident beam 26. Typically, a substantially larger quantity of incident light is reflected when reflective element 54 is positioned as shown in FIG. 2 to reflect the incident beam 26. Thus, passage of the reflective element 54 passed the location of incident beam 26 can be detected by a substantially larger quantity of reflective light. At least 60% of the reflected beam 56 passes through filter 28. The reflected beam 56 then impinges upon a second face of 50/50 beam splitter 44 where 50% of beam 56 passes through beam splitter 44 and is absorbed by the interior walls of the housing. The remaining 50% of the beam 56 is reflected of angle of 90°, at which point the still collimated reflected beam 56 impinges on focusing lens 48 and is converted to a converging beam 58, the focal point of which is adjusted to be coplanar with the active light sensing element of a PIN photo diode 36.

PIN photo diode 36 is permanently fixed, by mechanical means such as an adhesive, and positioned to receive light focused by focusing lens 48. PIN photo diode 36 has a peak spectral response at or near the frequency of light produced by laser diode 32, to match its response to the coherent light emitted by laser diode 32. For example, where laser diode 32 emits red light at a red length of 670 nm, PIN photo diode 36 is selected to have a peak spectrum response at or near 670 nm. In the event of the use of laser diode which emits a different wavelength of coherent light, a photo diode having a spectrum response to match will need to be selected accordingly. For example, laser diode 32 could emit light in the visible green wavelength range, in which case, the spectro line filter 46 and photo diode 36 would be selected and meshed for optical performance at that wavelength.

The photo diode 36 converts the converging beam 58 incident thereupon, into an electrical current which is delivered via leads 60 to a signal conditioning and laser detector circuit 34. Details of detector circuit 34 are explained below with reference to FIG. 3. Laser detector circuit 34, by proper setting of its triggering level, discriminates high intensity periods of the reflected beam 56, indicative of the reflective element 54, from lower intensity reflective beams indicative of other regions of the rotating body 52. Digital pulses are produced by laser detector circuit 34 on a line 62, which pulses are delivered to central processing unit 40 where these pulses may be counted and used to determine a rotational speed of the rotating element 52.

Central processing unit 40 operates under the control of software to evaluate the rotating speed of body 52 by counting clock pulses generating by a clock circuit 64 to determine the time between reflections from reflecting body 54, and thus determining the speed of rotating element 52.

Central processing unit 40 stores this information along with vibration data collected by central processing unit 40 using circuitry to be described below.

Central processing unit 40 is connected to accelerometers 70 to collect vibration data utilizing analog interface circuitry 72 and respective analog to digital converter 74 coupled to those analog interface circuits 72. The output of analog to digital converters 74 is collected by central processing unit 40 and stored for later delivery to a host computer and/or analysis. Central processing unit 40 utilizes a memory 76, which may include a solid state memory or a hard drive or a floppy drive memory, to store data collected from accelerometer 70 as well as tachometer readings obtained through laser detector 34. Data stored in memory 76 may be later output to a host computer via an RS232 serial interface 78 and the external RS232 connector 20 as discussed above.

An operator controls the operation of central processing unit 40 through key strokes at input keys 12, 13 and 14 as noted above. Feedback to an operator is provided by a display panel 16 as noted above.

Central processing unit 40 receives trigger signals on a line 80 that are externally generated at connector 22 via a power trigger interface circuit 82. Interface circuit 82 may also receive external power which is supplied to a power supply circuit 84. Power supply circuit 84 delivers supply voltages on lines 86 to other components of the palm top data collector 10. When a power supply is not connected to connector 22, power to palm top data collector 10 may be obtained from a battery 88 connected to power supply circuit 84 and included within the housing of palm top data collector 10.

Referring to FIG. 3, the laser detector circuit 34 for detecting light impinging upon PIN photo diode 36 can be explained. Photo diode 36 takes the form of the base-emitter junction of an opto-transistor. Carriers are injected into the base of opto-transistor 36 in proportion to light incident upon photo diode 36, thus producing a current flow from a collector to emitter of transistor 36 proportional to light impinging upon photo diode 36. The collector of photo diode 36 is connected via three kiloohm resistor 90 to a five volt power supply line 86. The emitter of photo diode 36 is connected via a second resistance 92 to a ground voltage. A one microfarad capacitor 94 is coupled between the collector of transistor 36 and ground to provide voltage stability to the node coupled to the collector of transistor 36. Current flow through transistor 36 creates voltage at the emitter of transistor 36 creating current flow through a one microfarad capacitor 94. This current flow creates voltage at the inverting input of operational amplifier 96. A shunt circuit including a 470 picofarad capacitor 98 and one megaohm resistor 100 are connected to the noninverting input of amplifier 96 to provide a shunt path for current generated in this manner.

The noninverting input of amplifier 96 is connected to a reference voltage at a node located between a 470 kiloohm resistor 102 and a 27 kiloohm resistor 104. As a consequence, the reference voltage applied to the noninverting input of amplifier 96 is approximately 270 millivolts.

The functions of the circuitry of FIG. 3 is to provide negative going pulses on line 62 whenever the light impinging upon PIN photo diode 36 is sufficient is generate a voltage at the inverting input of amplifier 96 that exceeds 270 millivolts. The component values used in FIG. 3 are adjusted accordingly to generate such negative going pulses only when strong reflections received from a reflective object 54 upon a rotating body 52. By adjusting the resistance values of resistors 102 and 104, different threshold voltages may be established, and thus different sensitivities for light impinging on photo diode 36 to produce negative going pulses on output line 64 for central processing unit 40.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A data collector, comprising
   a housing,
   a vibration signal input on said housing,
   an analog to digital converter within said housing connected to said vibration signal input, converting a vibration signal received at said vibration signal input to a digitized vibration signal,
   an optical system within said housing, said optical system receiving light from outside said housing,
   a receiver circuit converting said received light to a digital signal, and
   a digital signal processing circuit connected to said analog to digital converter and said receiver circuit, and receiving, storing or processing said digitized vibration signal and said digital signal converted from said received light, in real time, for the purpose of predictive maintenance,
   whereby the data collector is an integrated device with analog and digital signal processing and an optical system.

2. The data collector of claim 1 wherein said optical system further comprises a light source emitting light through an aperture in said housing for reflection and return to said optical system.

3. The data collector of claim 2 wherein said light source comprises a laser light source.

4. The data collector of claim 3 wherein said laser light source comprises a laser diode and a collimating lens, said collimating lens collimating diverging light from said laser diode to a collimated light beam emitted from said housing.

5. The data collector of claim 2 wherein said receiver circuit comprises a light detector for detecting reflected light, and said optical system further comprises a beam splitter positioned to direct reflected light received through said aperture to light detector, said beam splitter positioned between said light source and said aperture.

6. The data collector of claim 1 wherein said receiver circuit comprises a PIN diode for converting received light to an electrical signal.

7. The data collector of claim 6 wherein said receiver further comprises a threshold comparator for comparing current flow in said PIN diode to a threshold, and producing a digital signal to said digital signal processing circuit when said threshold is exceeded.

8. The data collector of claim 7 wherein said digital signal processing circuit computes a rate of rotation of a moving element in response to timing of said digital signal from said threshold comparator, whereby said optical system is usable as a laser tachometer.

9. The data collector of claim 6 wherein said optical system further comprises a filter positioned between said aperture and said PIN diode, said filter filtering light other than at a wavelength of said light source.

10. The data collector of claim 1 further comprising a storage device, said digital signal processing circuit storing said digitized vibration signal in said storage device.

11. The data collector of claim 2 further comprising a display and input keys, said digital signal processing circuit displaying operational information on said display and receiving operational instructions from an operator via said input keys.

12. The data collector of claim 1 wherein said housing is sized to fit in a single hand of an operator.

13. A method of collecting data for the purpose of predictive maintenance using a data collector, comprising
   receiving a vibration signal into a housing of said data collector, and converting said a vibration signal to a digitized vibration signal withing said housing,
   receiving light from outside said housing into said housing, and converting said received light to a digital signal, and
   simultaneously receiving, storing or processing said digitized vibration signal and said digital signal converted from said received light,
   whereby data is collected using an integrated device with analog and digital signal processing and an optical system.

14. The method of claim 13 further comprising generating light within said housing and emitting said light through an aperture in said housing for reflection and return.

15. The method of claim 14 wherein said light comprises laser light.

16. The method of claim 15 wherein said laser is generated by a laser diode and a collimating lens, said collimating lens collimating diverging light from said laser diode to a collimated light beam emitted from said housing.

17. The method of claim 14 wherein said light is received by a light detector for detecting reflected light, and further comprising positioning a beam splitter to direct reflected light received through an aperture in said housing to said light detector, said beam splitter positioned between said light source and said aperture.

18. The method of claim 13 wherein said light is received by a PIN diode and converted thereby to an electrical signal.

19. The method of claim 18 further comprising comparing current flow in said PIN diode to a threshold, and producing a digital signal when said threshold is exceeded.

20. The method of claim 19 further comprising computing a rate of rotation of a moving element in response to timing of said digital signal resulting from said threshold comparison.

21. The method of claim 18 further comprising positioning a filter between said aperture and said PIN diode, said filter filtering light other than at a wavelength of said light source.

22. The method of claim 13 further comprising storing said digitized vibration signal in a storage device.

23. The method of claim 14 further comprising displaying operational information on a display on said housing, and receiving operational instructions from an operator via input keys on said housing.

24. The method of claim 13 wherein said housing is sized to fit in a single hand of an operator.

* * * * *

UNITED STATES PATENT AND TRADEMARK OFFICE
CERTIFICATE OF CORRECTION

| | | |
|---|---|---|
| PATENT NO. | : 6,832,521 B1 | |
| DATED | : December 21, 2004 | |
| INVENTOR(S) | : Courtney et al. | |

It is certified that error appears in the above-identified patent and that said Letters Patent is hereby corrected as shown below:

<u>Title page,</u>
Item [56], References Cited, OTHER PUBLICATIONS,
delete "Prüttechnik", insert -- Prüftechnik --.

<u>Column 1,</u>
Line 12, delete "these vibration to", insert -- these vibrations to --.
Line 40, delete "identify an variations", insert -- identify variations --.

<u>Column 3,</u>
Line 22, delete "and an STORE", insert -- and a STORE --.
Line 30, delete "housing o the", insert -- housing of the --.

<u>Column 4,</u>
Line 31, delete "ing an collimating", insert -- ing a collimating --.
Line 58, delete "for collimation of", insert -- for collimation of --.

<u>Column 5,</u>
Line 13, delete "nm, will simultaneously", insert -- nm, while simultaneously --.
Line 16, delete "device. of", insert -- device of --.
Line 21, delete "immunity in either", insert -- immunity either --.
Line 48, delete "54 passed the", insert -- 54 past the --.

<u>Column 6,</u>
Lines 26-27, delete "52. (new paragraph) Central", insert -- 52. Central --.

<u>Column 7,</u>
Line 19, delete "3 is to", insert -- 3 are to --.
Line 21, delete "sufficient is generate", insert -- sufficient to generate --.

UNITED STATES PATENT AND TRADEMARK OFFICE
CERTIFICATE OF CORRECTION

PATENT NO. : 6,832,521 B1
DATED : December 21, 2004
INVENTOR(S) : Courtney et al.

It is certified that error appears in the above-identified patent and that said Letters Patent is hereby corrected as shown below:

<u>Column 8,</u>
Line 45, delete "said a vibration", insert -- said vibration --.
Line 46, delete "signal withing said", insert -- signal within said --.

Signed and Sealed this

Eleventh Day of April, 2006

JON W. DUDAS
*Director of the United States Patent and Trademark Office*